(No Model.)
J. M. BENSON & J. E. BERSLIN.
COMBINED KETTLE COVER, STRAINER, AND STEAM GUARD.
No. 531,300. Patented Dec. 25, 1894.
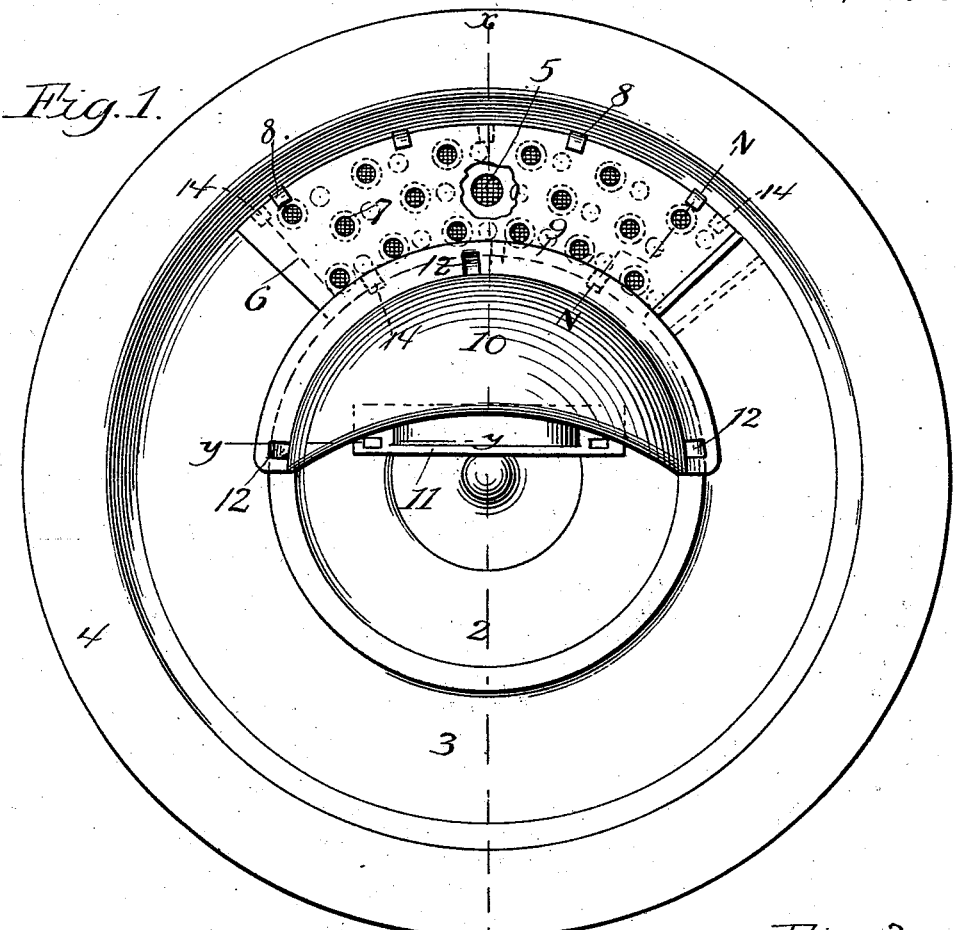
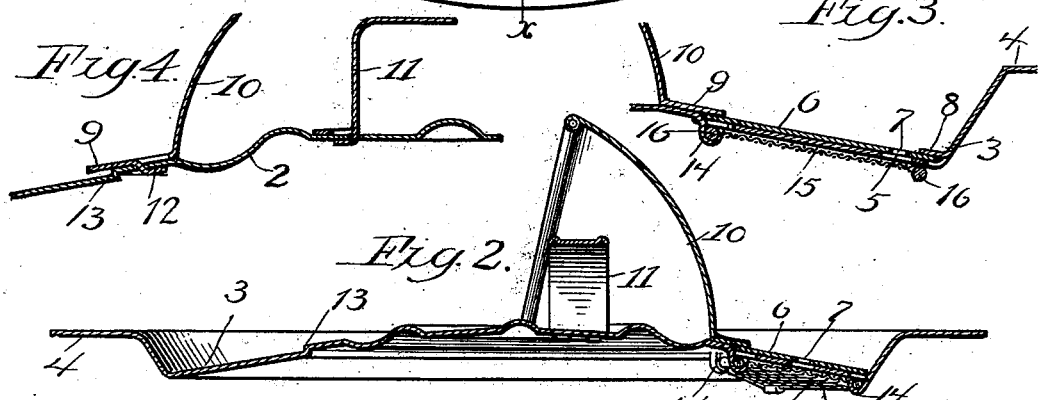
Witnesses
J. Jessen
M. C. Gooley
Inventors
James M. Benson
John E. Berslin
By Paul & Hawley, Att'ys

UNITED STATES PATENT OFFICE.

JAMES M. BENSON AND JOHN E. BERSLIN, OF MINNEAPOLIS, MINNESOTA.

COMBINED KETTLE-COVER, STRAINER, AND STEAM-GUARD.

SPECIFICATION forming part of Letters Patent No. 531,300, dated December 25, 1894.

Application filed May 22, 1894. Serial No. 512,057. (No model.)

*To all whom it may concern:*

Be it known that we, JAMES M. BENSON and JOHN E. BERSLIN, both of Minneapolis, county of Hennepin, State of Minnesota, have invented a certain new and Improved Combined Kettle-Cover, Strainer, and Steam-Guard, of which the following is a specification.

Our invention relates to a cover for kettles and like articles, said cover being provided with several strainers the upper one of which also forms a cover whereby the holes in the lid may be closed; and our invention further relates to a cover provided with means for preventing the scalding of the hands while the steaming liquid is being poured from the kettle.

The object of our invention is to provide a combination cover, strainer and guard which shall be of a very cheap construction and which, moreover, may be taken apart to be packed closely and snugly so that the lids may be shipped in a small bulk form.

Our invention consists in general in a device of the class described and of the construction and combination of parts all as hereinafter described and particularly pointed out in the claims.

The invention will be more readily understood by reference to the accompanying drawings, forming part of this specification, and in which—

Figure 1 is a plan view of a device embodying our invention. Fig. 2 is a sectional view thereof on the line $x$—$x$ of Fig. 1. Fig. 3 is an enlarged sectional view on the line $z$—$z$ of Fig. 1. Fig. 4 is a similarly enlarged section on the line $y$—$y$ of Fig. 1. Fig. 5 is a view of the upper slide by itself.

In the drawings 2 represents a circular cover of any suitable form provided with the depressed part 3 and the wide peripheral flange 4, of sufficient width so that the cover will fit different sizes of kettles. The lower part of the cover is conical in form and substantially one quarter of its surface is taken up by the strainer. In this section of the cover we provide a number of holes 5, and above the same arrange the curved slide 6 provided with smaller holes 7, which when the slide is moved into the position shown in Fig. 1 are respectively concentric with the holes beneath in the cover itself, while, when the slide is drawn slightly to one side as shown in dotted lines, the holes in the cover will all be closed. This curved slide which conforms to the shape of the lid is held in place on its outer edge by the upstruck lugs 8, stamped from the cover. There may be three or four of such lugs. The inner edge is retained beneath the overhanging flange 9 of the curved and upwardly extending steam guard 10. This steam guard is cup-like in form and the handle 11 of the lid is arranged beneath it and forward of the lid, so that a better purchase may be had to hold the edge of the lid down upon the kettle against the force of the liquid tending to push it away. The guard is held in place by several down-struck lugs 12 which pass through small slots provided in the lid. We preferably form an annular ledge 13 in the central part of the lid, the flange of the guard resting thereon and projecting over the same, a space being left between the lid and the flange for the slide 6. All of these parts are made of tin which may be pressed into form and in which the holes in the slots if necessary may be punched at the same time.

A number of small lugs 14 similar to the lugs 8 are struck down out of the metal, and these serve to hold a small wire screen 15.

The fabric of which the screen is formed is preferably bound upon a border 16 which conforms in shape to the upper slide and which border is slidably held within the down struck lugs 14.

It will be seen that the holes which are made in striking the lugs from the metal are all filled or closed by the upper slide.

Both the upper and the lower slides may be withdrawn or run into place. For straining coarse material both of the slides may be removed so that the liquid will pass out through the large holes 5 in the lid. Finer things may be strained through the holes in the sheet metal slide 6, while for straining very fine material the wire screen is employed. As these parts may be readily removed the lid may be kept clean without difficulty.

The steam guard forms the most important part of our invention as otherwise the hand of the user would be scalded by the steam rising from the kettle through the straining holes. It will be seen that the device is most economically constructed, as all rivets, hooks, &c., are dispensed with, the necessary fastening hooks being formed from the original sheet from which the lid is made. Furthermore, the guard and the handles may be packed separately for shipment. The same is true of the lids, the guards and the handles being placed thereon when required for use, it being only necessary to clinch the pin lugs depending from said parts as described.

Having thus described our invention, we claim as new and desire to secure by Letters Patent—

1. In a device of the class described, the combination with the lid, provided with holes 5, of the curved and conforming slide 6 having holes 7, and provided on the top of the lid, and the wire fabric screen slide supported on the under side of the lid and covering the holes therein, substantially as described.

2. The combination, in a device of the class described, of the lid, provided with the section having the holes 5, with the curved and conforming sheet metal slide 6 having holes 7, the steam guard 10 provided with the flange 9 beneath which the curved edge of said slide is retained and the struck-up lugs for retaining the lower edge of said slide, substantially as described.

3. The combination, with the lid, provided with the wide peripheral flange, and having the section provided with the holes 5, of the up and down-struck lugs provided at opposite edges of said perforated section, the sheet metal slide 6 having holes 7 smaller than those in the lid and having its lower edge retained by the struck-up lugs, the curved steam guard 10 having the flange 9 retaining the inner edge of said slide, and the framed screen slide held by the down-struck lugs, substantially as described.

4. The combination, with the lid, having the perforated sections, the means for closing the holes therein, the curved steam guard on the top of the lid and opposite the perforated section, and the handle of the lid arranged beneath said guard and forward of the center of the lid, substantially as and for the purpose specified.

In testimony whereof we have hereunto set our hands this 14th day of May, A. D. 1894.

JAMES M. BENSON.
JOHN E. BERSLIN.

In presence of—
 M. E. GOOLEY,
 C. G. HAWLEY.